3,145,211
TROPYL ESTERS OF α-CYCLOALKYL-ALKANOIC ACIDS

Rolland F. Feldkamp, Evansville, Ind., assignor to Sterling Drug Inc., New York, N.Y., a corporation of Delaware
No Drawing. Filed Jan. 4, 1962, Ser. No. 164,383
8 Claims. (Cl. 260—292)

This invention relates to new basic esters, and in particular is concerned with tropyl esters of lower-alkanoic acids having from three to eight carbon atoms, inclusive, and having attached to the alpha-position a cycloalkyl group, and with the preparation thereof.

The compounds of the invention in the free base form have the following structural formula:

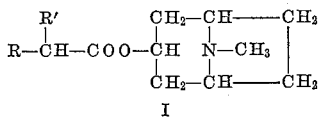

I wherein R is cycloalkyl and R' is lower-alkyl having from one to six carbon atoms.

The cycloalkyl group, R, preferably is a 5- or 6-membered ring and thus can be cyclopentyl, cyclohexyl or lower-alkylated derivatives thereof such as 2-methylcyclopentyl, 3-ethylcyclopentyl, 4-methylcyclohexyl, 3,4-dimethylcyclohexyl, and the like.

The lower-alkyl group, R', has from one to six carbon atoms and can be straight or branched, thus including methyl, ethyl, propyl, isopropyl, butyl, secondary-butyl, tertiary-butyl, pentyl, isopentyl, hexyl, and the like.

The term "tropyl" as used hereinabove is intended to cover both the radical derived from the naturally occurring tropine and the radical derived from its stereoisomer, pseudotropine.

The compounds of Formula I are prepared by treating tropine or pseudotropine with an acid halide (preferably chloride or bromide) of a lower-alkanoic acid having from three to eight carbon atoms, inclusive, and having attached to the alpha-position a cycloalkyl group. The reaction takes place at a temperature between about 50° C. and 150° C., optionally in the presence of an inert solvent. The product is obtained in the form of its hydrohalide salt which can then be converted to the free base by treating it with a strong base.

This invention embraces the free bases having the Formula I above and the acid-addition and quaternary ammonium salt forms thereof. The acid-addition salts are prepared by causing the free base to react with a strong inorganic or organic acid, usually in an inert solvent or reaction medium. Examples of appropriate acids include hydrochloric, hydrobromic, sulfuric, phosphoric, citric, tartaric, quinic, benzenesulfonic acid, and the like.

The quaternary ammonium salts of the compounds of the invention are prepared by causing a free base to react with an ester of a strong inorganic or organic sulfonic acid, said ester preferably having a molecular weight less than about 200. A particularly preferred class of esters, because of their ready availability, are lower-alkyl, lower-alkenyl and monocarbocyclic aryl-lower-alkyl esters, for example, methyl iodide, ethyl iodide, ethyl bromide, propyl bromide, butyl bromide, allyl bromide, methyl sulfate, methyl benzenesulfonate, methyl p-toluenesulfonate, benzyl chloride, o-chlorobenzyl chloride, and the like. The reaction of the free base and the quaternizing agent takes place upon simple admixture of the components, preferably in the presence of an inert organic solvent, although heating may be applied to accelerate the reaction.

The acid-addition and quaternary ammonium salts preferably have anions which are pharmacologically acceptable, that is, the anions do not appreciably increase the toxicity of the compound as a whole toward animal organisms. Such anions include, for example, the chloride, bromide, iodide, sulfate or acid sulfate, methanesulfonate, benzenesulfonate, and the like. Salts having toxic anions are, however, useful in that they serve as characterizing derivatives of the free base and serve as intermediates for non-toxic quaternary salts by conventional ion exchange reactions. All acid-addition salts, regardless of the nature of the anions, are useful as intermediates in the purification of the free bases.

The structure of the compounds of the invention was established by the method of preparation and by the fact that the resutls of chemical analysis were in agreement with the expected structures.

Pharmacological evaluation of the compounds of Formula I has indicated that they possess pharmacodynamic activity. In particular they possess antispasmodic activity as evidenced by their ability to counteract the effects of choline and its derivatives.

The following examples will further illustrate the invention without the latter being limited thereby.

EXAMPLE 1

(a) 2-Cyclopentyl-4-Methylpentanoyl Chloride 2-cyclopentyl-4-methylpentanoic acid (37.5 g., 0.20 mole) was added dropwise to 29 ml. (47.6 g., 0.40 mole) of thionyl chloride, protected against moisture. The reaction was initiated with gentle heating, and the reaction mixture maintained at reflux for two hours after the addition of the acid was completed. The excess thionyl chloride was removed by distillation at reduced pressure followed by addition and distillation of three 30 ml. portions of benzene. The residual product was distilled to give 2-cyclopentyl-4-methylpentanoyl chloride, B.P. 112–145° C. (15 mm.); $n_D^{25}$=1.4610.

By replacing the 2-cyclopentyl-4-methylpentanoic acid in the foregoing preparation by a molar equivalent amount of 2-cyclopentylpentanoic acid, 2-cyclopentylheptanoic acid, 2-cyclopentyl-4-ethylhexanoic acid, 2-cyclohexylpropanoic acid, or 2-cyclohexylhexanoic acid, there can be obtained, respectively, 2-cyclopentylpentanoyl chloride, 2-cyclopentylheptanoyl chloride, 2-cyclopentyl-4-ethylhexanoyl chloride, 2-cyclohexylpropanoyl chloride, or 2-cyclohexylhexanoyl chloride.

(b) Tropyl 2-Cyclopentyl-4-Methylpentanoate
[I; R is $C_5H_9$, R' is $CH_2CH(CH_3)_2$]

A solution of 35.7 g. (0.25 mole) of tropine in 300 ml. of dry benzene was gradually added to a stirred solution of 50.7 g. (0.25 mole) of 2-cyclopentyl-4-methylpentanoyl chloride in 300 ml. of dry benzene, protected against moisture. The reaction mixture was refluxed for five hours, cooled, and filtered to remove solid material consisting largely of tropine hydrochloride. The filtrate was extracted several times with dilute hydrochloric acid, and the aqueous extracts were combined and made basic with 10% sodium carbonate solution. The basic mixture was extracted with ether, the ether solution concentrated, and the residue distilled to give tropyl 2-cyclopentyl-4-methylpentanoate in the form of a yellow oil, $n_D^{25}$=1.4850. The latter was dissolved in anhydrous ether and treated with gaseous hydrogen chloride. The salt which separated was recrystallized from isopropyl alcohol and from an isopropyl alcohol-isopropyl ether mixture to give tropyl 2-cyclopentyl-4-methylpentanoate in the form of its hydrochloride salt, M.P. 230.0–230.5° C. (corr.) (dec.).

Tropyl 2-cyclopentyl-4-methylpentanoate in the form of its hydrochloride salt, when tested for mydriasis in the mouse by the method described by Long et al., J. Pharmacol. Exptl. Therap. 117, 29 (1956), had an $ED_{50}$ value of 3.1 mg./kg. The intravenous toxicity of this compound in the mouse was determined and an $ALD_{50}$ value of 22 mg./kg. was found.

By replacing the 2-cyclopentyl-4-methylpentanoyl chloride in the foregoing preparation by a molar equivalent amount of 2-cyclopentylpentanoyl chloride, 2-cyclopentylheptanoyl chloride, 2-cyclopentyl-4-ethylhexanoyl chloride, 2-cyclohexylpropanoyl chloride, or 2-cyclohexylhexanoyl chloride, there can be obtained, respectively, tropyl 2-cyclopentylpentanoate [I; R is $C_5H_9$, R' is $$CH_2CH_2CH_3]$$

tropyl 2-cyclopentylheptanoate [I; R is $C_5H_9$, R' is $(CH_2)_4CH_3$], tropyl 2-cyclopentyl-4-ethylhexanoate [I; R is $C_5H_9$, R' is $CH_2CH(C_2H_5)CH_2CH_3$], tropyl 2-cyclohexylpropanoate [I; R is $C_6H_{11}$, R' is $CH_3$], or tropyl 2-cyclohexylhexanoate [I; R is $C_6H_{11}$, R' is $(CH_2)_3CH_3$].

By treating tropyl 2-cyclopentyl-4-methylpentanoate with hydrofluoric acid, hydrobromic acid, sulfuric acid, phosphoric acid, ethanesulfonic acid, p-toluenesulfonic acid, acetic acid, tartaric acid, lactic acid, or quinic acid, the compound can be obtained in the form of its hydrofluoride, hydrobromide, sulfate (or bisulfate), phosphate (or acid phosphate), ethanesulfonate, p-toluenesulfonate, acetate, tartrate (or acid tartrate), lactate, or quinate salts, respectively. The hydrofluoride salt can be converted to the hydrochloride salt by contacting the former with an ion-exchange resin saturated with chloride ion.

EXAMPLE 2

*Tropyl 2-Cyclopentyl-4-Methylpentanoate Methobromide*

Methyl bromide gas (5.7 g., 0.06 mole) was passed into a solution of 6.1 g. (0.02 mole) of tropyl 2-cyclopentyl-4-methylpentanoate in 40 ml. of acetonitrile. The solution was warmed slightly and then allowed to stand at room temperature for about fifteen hours. The reaction mixture was concentrated in vacuo and the residue recrystallized from ethanol to give tropyl 2-cyclopentyl-4-methylpentanoate methobromide, M.P. above 300°.

Tropyl 2 - cyclopentyl-4-methylpentanoate methobromide was found to have an antispasmodic activity about 90% that of atropine sulfate when tested by the modified Magnus method [Luduena and Lands, J. Pharmacol. Exptl. Therap. 110, 282 (1954)].

By replacing the methyl bromide in the foregoing preparation by a molar equivalent amount of ethyl iodide, n-propyl chloride, hexyl bromide, allyl bromide, benzyl bromide or o-chlorobenzyl chloride, there can be obtained, respectively, tropyl 2-cyclopentyl-4-methylpentanoate ethiodide, tropyl 2-cyclopentyl-4-methylpentanoate propochloride, tropyl 2-cyclopentyl-4-methylpentanoate hexobromide, tropyl 2-cyclopentyl-4-methylpentanoate allobromide, tropyl 2-cyclopentyl-4-methylpentanoate benzobromide, or tropyl 2 - cyclopentyl - 4 - methylpentanoate benzochloride.

EXAMPLE 3

Pseudotropyl 2-cyclopentyl - 4 - methylpentanoate was prepared from pseudotropine and 2-cyclopentyl-4-methylpentanoyl chloride according to the manipulative procedure described above in Example 1, Part *b*. The free base had the B.P. 123–127° C. (0.10–0.13 mm.), $n_D^{25}=1.4806$; and the hydrochloride salt had the M.P. 253.5–255.0° C. (corr.) when recrystallized from an ethanol-ether mixture.

EXAMPLE 4

Pseudotropyl 2-cyclopentyl-4-methylpentanoate methobromide was prepared from pseudotropyl 2-cyclopentyl-4-methylpentanoate and methyl bromide in acetonitrile according to the manipulative procedure described above in Example 2, and it had the M.P. 277–280° C. (corr.) when recrystallized from an acetonitrile-ethyl ether mixture.

Pseudotropyl 2-cyclopentyl-4-methylpentanoate methobromide was found to have an antispasmodic activity about 21% that of atropine sulfate when tested by the modified Magnus method.

I claim:
1. A member of the group consisting of (A) tropyl esters of lower-alkanoic acids having from three to eight carbon atoms, inclusive, and having attached to the alpha-position a cycloalkyl group of 5–6 ring members; (B) acid-addition salts thereof; and (C) lower-alkyl, lower-alkenyl and monocarbocyclic aryl-lower-alkyl quaternary ammonium salts thereof.
2. A tropyl ester of a lower-alkanoic acid having from three to eight carbon atoms, inclusive, and having cyclopentyl attached to the alpha-position.
3. Tropyl 2-cyclopentyl-4-methylpentanoate.
4. Pseudotropyl 2-cyclopentyl-4-methylpentanoate.
5. An acid-addition salt of tropyl 2-cyclopentyl-4-methylpentanoate.
6. An acid-addition salt of pseudotropyl 2-cyclopentyl-4-methylpentanoate.
7. A lower-alkahalide salt of tropyl 2-cyclopentyl-4-methylpentanoate.
8. A lower-alkahalide salt of pseudotropyl 2-cyclopentyl-4-methylpentanoate.

References Cited in the file of this patent
UNITED STATES PATENTS 2,265,184    Miescher et al. ---------- Dec. 2, 1941
2,962,499    Weiner et al. ---------- Nov. 29, 1960

OTHER REFERENCES

Coan et al.: J. Org. Chem., Vol. 20, pp. 774–9, 1955 (Abstracted Chem. Abstracts, Vol. 50, col. 7794–5, 1956).